United States Patent
Forbord et al.

[11] Patent Number: 6,018,439
[45] Date of Patent: Jan. 25, 2000

[54] CONNECTOR ASSEMBLY FOR CONNECTING TRANSDUCING HEADS TO A FLEX CIRCUIT OF A DISC DRIVE

[75] Inventors: Kent J. Forbord, St. Louis Park; Adam K. Himes, Richfield, both of Minn.

[73] Assignee: Seagate Technology, Inc., Scotts Valley, Calif.

[21] Appl. No.: 09/104,875

[22] Filed: Jun. 25, 1998

Related U.S. Application Data

[60] Provisional application No. 60/057,955, Sep. 5, 1997, and provisional application No. 60/063,322, Oct. 27, 1997.

[51] Int. Cl.[7] .................................................. G11B 5/48
[52] U.S. Cl. .............................................................. 360/104
[58] Field of Search ............................................... 360/104

[56] References Cited

U.S. PATENT DOCUMENTS

| | | | |
|---|---|---|---|
| 5,012,368 | 4/1991 | Bosier et al. | 360/104 |
| 5,121,273 | 6/1992 | Slezak | 360/104 |
| 5,305,168 | 4/1994 | Lin et al. | 360/104 |
| 5,404,636 | 4/1995 | Stefansky et al. | 29/603 |
| 5,422,764 | 6/1995 | McIlvanie | 360/97.01 |
| 5,477,401 | 12/1995 | Squires et al. | 360/75 |
| 5,590,001 | 12/1996 | Ino et al. | 360/97.02 |
| 5,602,700 | 2/1997 | Viskochil et al. | 360/105 |
| 5,644,448 | 7/1997 | Suzuki | 360/97.01 |
| 5,872,687 | 2/1999 | Prakash | 360/104 |
| 5,883,759 | 3/1999 | Schulz | 360/104 |
| 5,909,342 | 6/1999 | Forbord | 360/106 |

*Primary Examiner*—A. J. Heinz
*Attorney, Agent, or Firm*—Kinney & Lange

[57] ABSTRACT

A conductor assembly electrically connects a transducer supported on an E-block to a flex circuit mounted to the E-block. A conductor strip has a plurality of electrical conductors connected to the transducer. A fin is coupled to the plurality of conductors. The fin engages a slot on the E-block, and a plurality of conductive tabs are electrically connected to respective ones of the electrical conductors. The tabs extend from the slot and rigidly engage tabs on the flex circuit to prevent the fins from disengaging the slot.

17 Claims, 5 Drawing Sheets

6,018,439

CONNECTOR ASSEMBLY FOR CONNECTING TRANSDUCING HEADS TO A FLEX CIRCUIT OF A DISC DRIVE

CROSS-REFERENCE TO RELATED APPLICATION(S)

This application claims priority from U.S. Provisional Application No. 60/057,955, filed Sep. 5, 1997 for "Ultra High Performance Disc Drive" by Kent J. Forbord and from U.S. Provisional Application No. 60/063,322, filed Oct. 27, 1997 for "Ultra High Performance Disc Drive" by Kent J. Forbord.

BACKGROUND OF THE INVENTION

This invention relates to magnetic disc drive assemblies of the class employing a stack of rigid discs in a standard housing profile.

Magnetic disc drive assemblies employing rigid, or hard, discs are commonly used in desktop and other computer mainframes as a principal memory for the computer. One difficulty with present disc drives is that there is often too little space within the disc drive housing to permit assembly of component and the addition of new components. Rigid disc drives employing a stack of rigid recording discs have actuator assemblies that include an E-block that rotates, under the influence of a motor, to position actuator arms at various radial positions between the discs. One or two load beams or arms are mounted to the distal ends of the actuator arms, each load beam supporting a gimbal which in turn supports a slider and transducing head to confront one disc surface.

The transducing heads are electrically connected to other portions of the disc drive through circuit connections. A flex circuit extends across the space adjacent to the E-block to a bulkhead connector mounted on a wall of the disc drive housing; the flex circuit being flexible and occupying the space necessary to bend or "fold" within the disc drive housing. The bulkhead connector is connected to other electronics within and outside the disc drive housing. On the E-block, the flex circuit is connected to a conductor assembly that is mounted to the E-block and extends along the actuator arms and suspensions to electrically connect the flex circuit to the transducers. In some applications, the conductor assembly comprises printed wiring supported by the actuator arm and suspension, and other applications, the conductor assembly may itself be a flex circuit that is mounted to the E-block. In either case, the conductor assembly and the flex circuit to the bulkhead connector are mounted to the E-block prior to assembly of the E-block into the disc drive. There is a need, therefore, for a conductor assembly that may be assembled to the E-block outside the drive housing with confidence of registration of elements to other parts.

BRIEF SUMMARY OF THE INVENTION

In accordance with the present invention, a conductor assembly electrically connects a transducer supported by an actuator arm of an E-block to a flex circuit. The flex circuit is rigidly mounted to the E-block. The E-block includes a slot in the actuator arm. The conductor assembly includes an elongated flexible conductor strip having a plurality of electrical conductors each having a first end connected to the transducer. A plurality of conductive tabs are electrically connected to respective second ends of respective ones of the plurality of electrical conductors. The tabs are rigidly connected to the flex circuit. A fin extends from the conductor strip opposite the tabs to engage the slot, the fin being restrained from disengaging the slot by the rigid connection of the tabs to the flex circuit.

In a preferred form of the invention, an actuator assembly comprises an E-block having a plurality of actuator arms, at least one load beam supported by each actuator arm, and a transducer supported by each load beam. The actuator arms, load beams and transducers are arranged so that the E-block positions the transducers adjacent selected locations on a rotatable recording disc. A conductor assembly electrically connects the transducer to a flex circuit that in turn is rigidly mounted to the E-block. The conductor assembly includes a plurality of slots in the E-block, at least one slot extending along a side portion of each actuator arm. A plurality of conductor strips are supported in respective slots in the E-block. Each conductor strip has an insulator ribbon containing a plurality of electrical conductors. An insulator termination portion is mounted to a respective load beam and connects the conductor strip to the transducer. A plurality of conductive tabs are electrically connected to respective ones of the plurality of electrical conductors in the ribbon, the tabs extending from a fin coupled to the conductor strip. A plurality of slots and conductive pads on the flex circuit receive the conductive tabs to electrically and rigidly connect the tabs on the conductor strips to the pads on the flex circuit so that the fins and ribbons on the conductor strips engage respective slots on the E-block and are restrained from disengaging the slots on the E-block by the rigid connection of tabs to the pads.

DETAILED DESCRIPTION OF THE PREFERRED EMBODIMENTS

Figure 1:
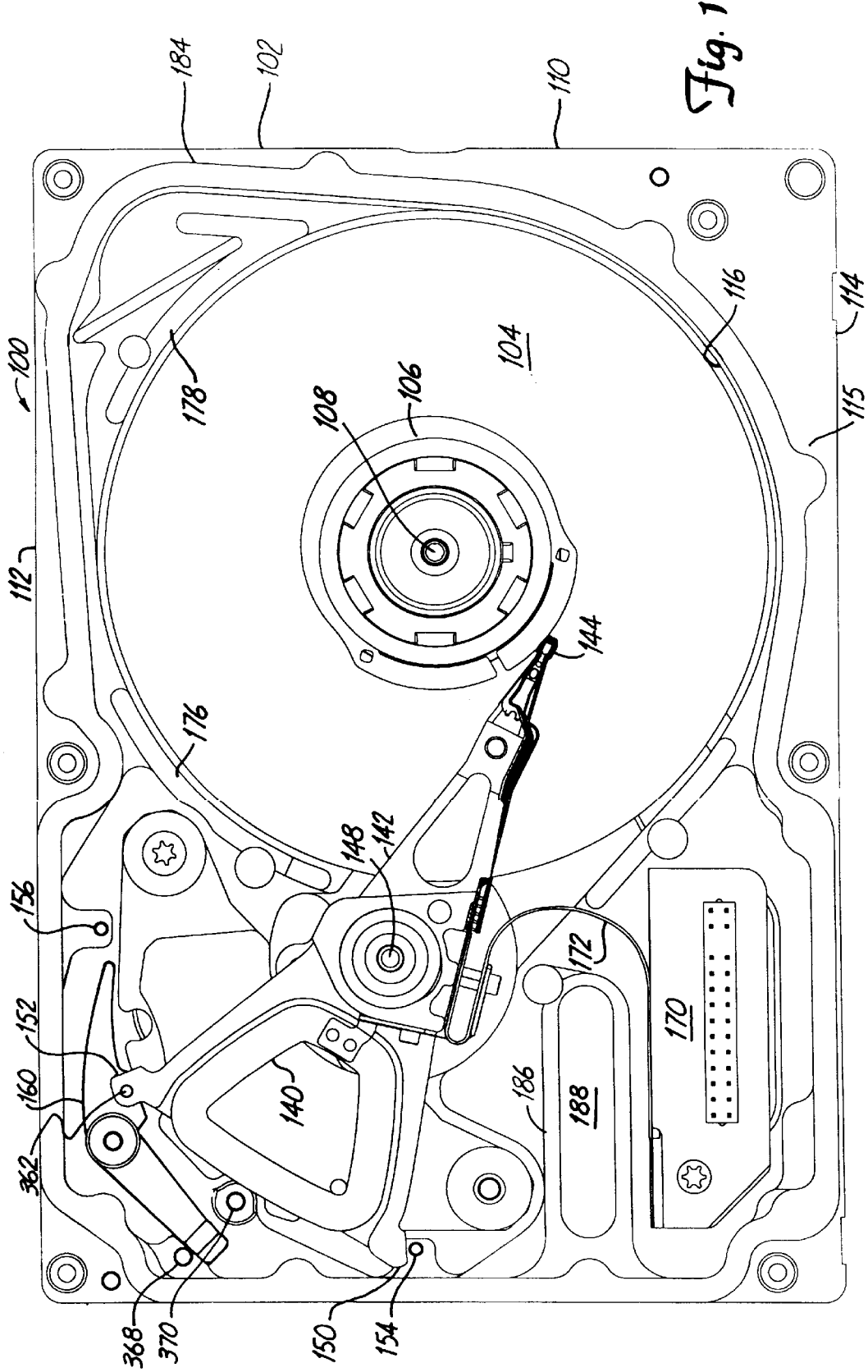
FIG. 1 is a top plan view of a magnetic disc drive, with the top cover removed, in accordance with the present invention.

FIG. 1 illustrates a top view of a disc drive 100 in accordance with one embodiment of the present invention. Disc drive 100 includes a housing 102 containing a stack of twelve discs 104 mounted to a disc spindle 106 centered on an axis 108. Typically, printed circuits (not shown) are formed in housing 102 on a bottom surface to provide connection to voice coil motor 140 for E-block 142, as well as data paths to bulkhead connector 170 mounted to the bottom wall of housing 102. Flex circuit 172 is connected to connector 170 and to conductors 214 on E-block 142 to provide signals to transducer heads 144 mounted to each load beam 146 at the end of the actuator arms of E-block 142. Flex circuit 172 also carries voice coil signals for motor 140.

Figure 2:
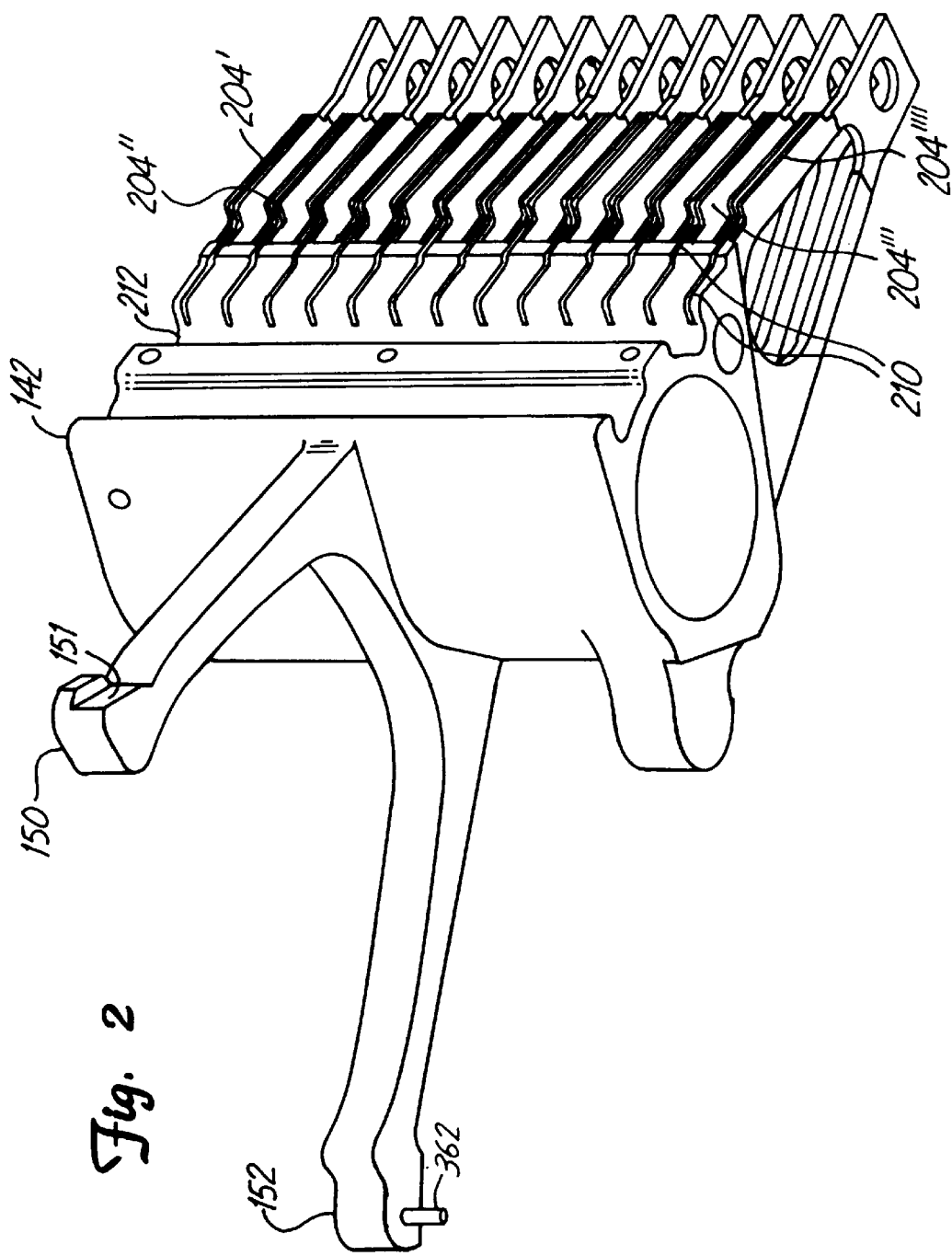
FIG. 2 is a perspective view of a portion of an actuator assembly of the disc drive illustrated in FIG. 1.

As shown in FIG. 2, E-block 142 has a plurality of actuator arms 204' . . . 204''''. For the twelve discs of the disc drive illustrated in FIG. 1, there are thirteen actuator arms 204 of E-block 142. Actuator arms 204' and 204"" carry a single load beam 146 and transducer head 144 (FIG. 1), whereas actuator arms 204" . . . 204'" each carry two load beams 146 and transducer heads 144. Each disc spins between two actuator arms, load beams and gimbal/slider/head arrangements so that a single transducer head confronts each disc surface. As shown in FIG. 2, actuator E-block 142 includes a plurality of thirteen slots 210 extending between an axial slot 212 and actuator arms 204.

Figure 3:
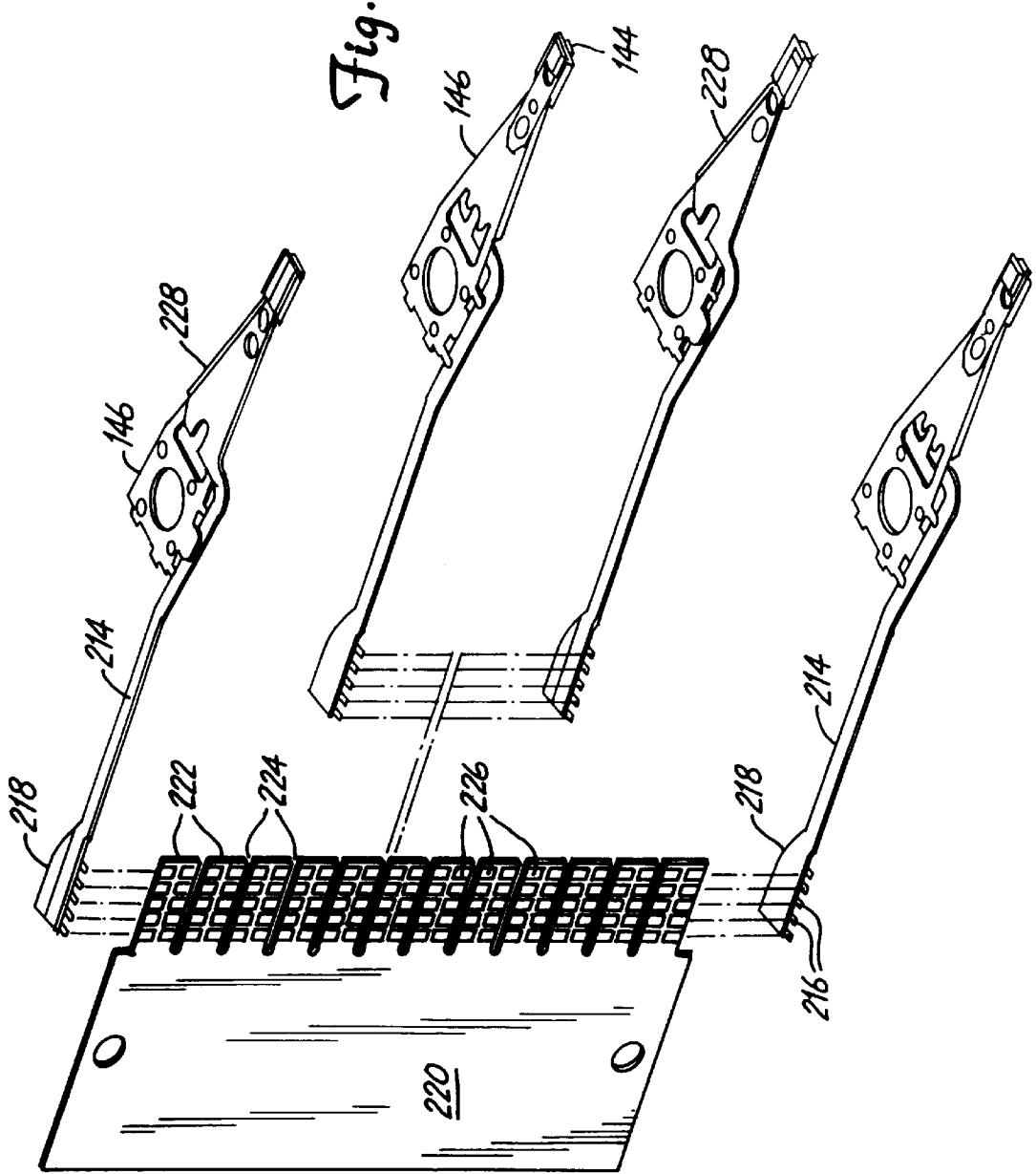
FIG. 3 is an exploded perspective view illustrating connection of conductors between a flex circuit and transducing heads supported on load beam/gimbal assemblies of the actuator assembly illustrated in FIG. 2.

FIG. 3 illustrates a plurality of load beams 146 terminating at transducer heads 144 on sliders. A conductor strip 214 extends from transducer heads 144 and terminates at tabs 216. The conductor strip 214 comprises a suitable ribbon of insulator material, such as Kapton encapsulating a plurality of printed copper traces 215 that provide electrical connection between tabs 216 and transducer heads 144. For flexibility, conductor strip 214 is preferably about 2 to 3 mils thick. Tabs 216 on each conductor strip form conductive terminations for the copper traces on the conductor strip. Tabs 216 project outwardly from conductor strip 214 opposite a fin 218. Each fin 218 is constructed of Kapton and copper traces, and has a thickness that may be equal to the thickness of conductor strip 214. Conductor strips 214 further include terminations 228 that distribute electrical connections from the conductor strip portion to transducer heads 144. Each termination 228 is adhesively attached to one side of a respective load beam 146 on a side of the load beam opposite head/slider 144. With load beams 146 mounted to actuator arms 204 and terminations 228 attached to the load beams, conductor strips 214 extend along the length of the actuator arms along one side thereof. Conductor strips 214 and fins 218 are located in slots 210 in E-block 142 (FIG. 2). In the case of actuator arms 204' and 204"", slot 210 is wide enough to accommodate a single conductor strip and fin assembly, whereas the slots for actuator arms 204"–204'" are wide enough to accommodate two conductor strip and fin assemblies for the two transducer heads supported by the arm.

Substrate 220 (FIG. 3) is mounted to E-block 142 and is connected to flex circuit 170 (FIG. 1). Substrate 220 includes a plurality of extensions 222 forming slots 224 therebetween, matching slots 210 on E-block 142 at the position of tabs 216, except there is no slot 224 corresponding to a the uppermost and lowermost slots 210 on the E-block. Each extension 222 includes a plurality of conductive pads 226 extending to and facing an individual slot 224. Each pad 226 corresponds to an individual one of tabs 216 of conductor strips 214. With the conductor strips 214 in place and fins 218 assembled into slots 210, the individual tabs 216 protrude through slots 224 in substrate 220 adjacent each pad 226. Tabs 216 are thereupon bent into contact with an individual pad 226 and soldered in place, such as by reflow soldering.

Figure 4:
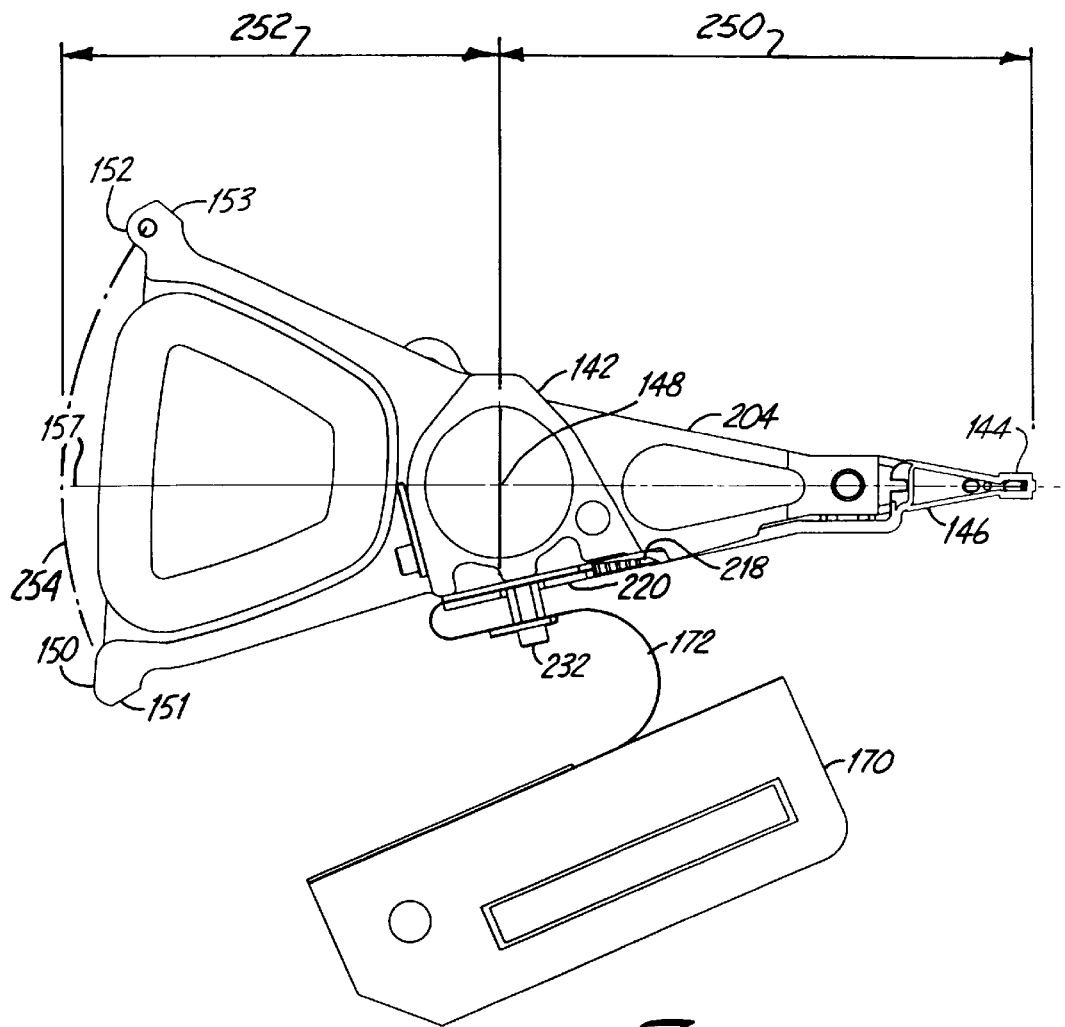
FIG. 4 is a top view of the actuator assembly illustrated in FIG. 2 with the conductors in place.
Figure 5:
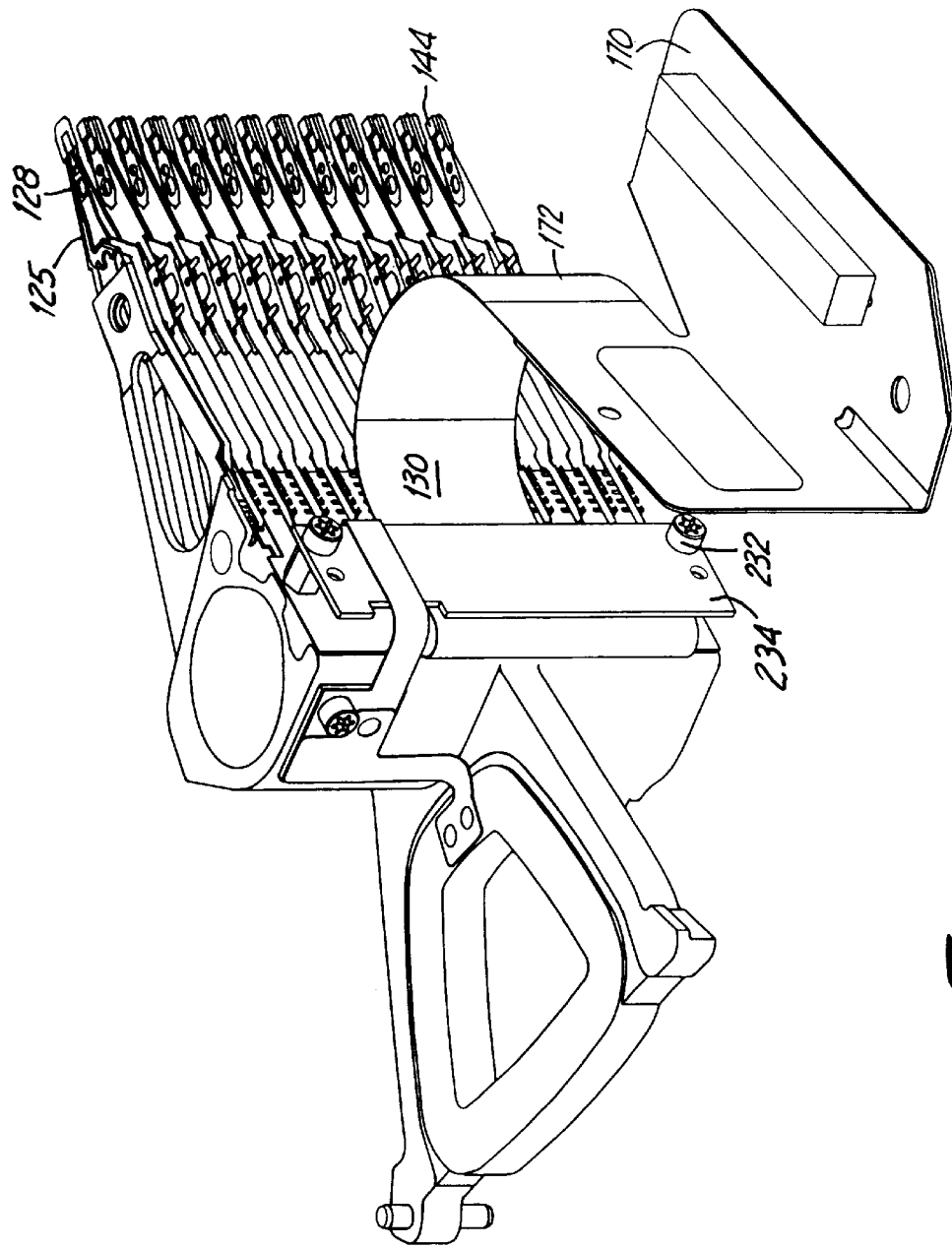
FIG. 5 is a perspective view of the complete actuator assembly of the disc drive illustrated in FIG. 1.

As shown particularly in FIGS. 4 and 5, flexible circuit 172 provides a flexible connection to substrate 220 and is mounted thereto and sandwiched against E-block 142 by fasteners 232. As shown particularly in FIG. 5, stiffener plate 234 sandwiches the assembly together to rigidly connect flex circuit 172 to substrate 220 and to the E-block. Stiffener plate 234 provides a rigid mount of substrate 220 to the E-block and substrate 220 fixedly positions conductor strips 214 and their respective fins in the respective slots in the E-block. Because fins 218 extend into the E-block and are held in their respective slots 210 by the rigid fastening of tabs 216 to substrate 220 which is rigidly positioned by stiffener plate 234, fins 218 cannot accidentally separate from slots 210. Consequently, fins 218 may be loosely received in the slots, and held in place by stiffener plate 234.

The connector assembly of the present invention may be largely assembled outside the disc drive. More particularly, transducer heads and suspensions are assembled to load beams 146 which are swagged to the actuator arms of the E-block. Conductor strips 214 are connected to the transducer heads and assembled into the slots 210 in load beams 146 and the E-block. Substrate 220 is assembled to the E-block. Due to the nesting of fins 218 to respective slots 210, conductor strips 214 are properly aligned so that the protruding tabs 216 are in alignment with pads 226 on substrate 220. With the alignment completed, tabs 216 are soldered to pads 226 to complete the assembly of the conductor strips to the E-block. Flex circuit 172 is then connected to substrate 220 and stiffener plate 234 is mounted to the E-block. Final assembly is accomplished by assembling actuator assembly into the drive housing and connecting flex circuit 172 to bulkhead connector 170 (FIG. 1).

During assembly, conductor strips 214 are held in place in slots 210 in the E-block by virtue of fins 218 extending more deeply into the slots 210 in the E-block directly opposite the connection of tabs 216 to the substrate. With the opposite ends of conductor strips 214 being connected to the load beams by the adhesive attachment of terminations 228, a small tension is imposed on conductor strips 214 to hold them in place in the slots for alignment of tabs 216 to pads 226 during soldering. This arrangement ensures that fins 218 remain in slots 210, thereby ensuring that conductor strips 214 remain in place during assembly, even though the conductor strips and fins are loosely coupled to the slots 210. The solder connection of tabs 216 to pads 226 assures rigid mounting of conductor strips 214 to substrate 220 (which in turn is rigidly mounted to the E-block). Moreover, although slots 224 in substrate 220 provide convenient access of the tabs to the exposed surface of the substrate, slots 224 are not necessary for the placement of fins 218 in slots 210, and the fins remain in their respective slots 210 even if slot 224 is not present. Most particularly, as shown in FIG. 3, the tabs 216 of the uppermost and lowermost conductor strips do not extend through slots 224 in substrate 220. Instead, these conductor strips, like the other conductor strips of the assembly, are held in place by fins 218 in respective slots 210.

The connector assembly of the present invention provides a convenient technique for assembly of the E-block and conductors outside the drive housing, coupled with assured registration of the E-block elements to other elements of the drive during final assembly. The connector assembly reduces the difficulty of assembly over prior techniques, thereby reducing overall costs of assembly.

Although the present invention has been described with reference to preferred embodiments, workers skilled in the art will recognize that changes may be made in form and detail without departing from the spirit and scope of the invention.

We claim:

1. A conductor assembly for electrically connecting a transducer supported by an actuator arm of an E-block to a flex circuit having an end rigidly mounted to the E-block, the conductor assembly comprising:

a slot in the actuator arm of the E-block; and an elongated flexible conductor strip having a plurality of electrical conductors rigidly mounted to the actuator arm adjacent the transducer, each electrical conductor having a first end connected to the transducer, a plurality of conductive tabs electrically connected to respective second ends of respective ones of the plurality of electrical conductors, the tabs rigidly mounting the second ends of the electrical conductors to the flex circuit, the rigid mount of the ends of the electrical conductors imposing a tension on the electrical conductors between the first and second ends, and a fin extending into the slot from the conductor strip opposite the tabs, the fin engaging the slot and restrained from disengaging from the slot by the rigid mount of the second ends of the electrical conductors to the flex circuit and the tension on the electrical conductors.

2. The conductor assembly of claim 1, further including a stiffener plate fastening the flex circuit to the E-block.

3. The conductor assembly of claim 1, wherein the flex circuit includes a substrate having a plurality of conductive pads, slot adjacent the pads receiving the tabs of the conductor strip, the tabs being rigidly connected to respective ones of the pads.

4. The conductor assembly of claim 3, further including a stiffener plate fastening the flex circuit to the E-block.

5. The conductor assembly of claim 3, wherein the transducer is mounted to a load beam which is mounted to the actuator arm, wherein the conductor strip includes a termination portion fastened to the load beam.

6. The conductor assembly of claim 5, wherein the conductor strip includes a ribbon containing the plurality of conductors extending between the tabs and the termination portion, the slot in the actuator arm extending along the length of the actuator arm and receiving the ribbon.

7. The conductor assembly of claim 6, wherein the ribbon is retained in the slot by the tension in the electrical conductors.

8. The conductor assembly of claim 6, wherein the E-block includes a plurality of actuator arms each supporting at least one load beam, each actuator arm having at least one slot receiving a ribbon of a respective conductor strip.

9. The conductor assembly of claim 6, wherein the ribbon, termination portion and fin are constructed of insulating material.

10. The conductor assembly of claim 1, wherein the transducer is mounted to a load beam which is mounted to the actuator arm, wherein the conductor strip includes a termination portion fastened to the load beam.

11. The conductor assembly of claim 10, wherein the ribbon is retained in the slot by the tension in the electrical conductors.

12. The conductor assembly of claim 11, wherein the conductor strip includes a ribbon containing the plurality of conductors extending between the tabs and the termination portion, the slot in the actuator arm extending along the length of the actuator arm and receiving the ribbon.

13. The conductor assembly of claim 12, wherein the E-block includes a plurality of actuator arms each supporting at least one load beam, each actuator arm having at least one slot receiving a ribbon of a respective conductor strip.

14. The conductor assembly of claim 12, wherein the ribbon, termination portion and fin are constructed of insulating material.

15. An actuator assembly comprising an E-block having a plurality of actuator arms, at least one load beam supported by each actuator arm, a transducer supported by each load beam, the actuator arms, load beams and transducers being arranged so that the E-block positions the transducers adjacent selected locations on a rotatable recording disc, and a conductor assembly for electrically connecting the transducer to a flex circuit rigidly mounted to the E-block, the conductor assembly comprising:

a plurality of slots in the E-block, at least one slot extending along a side portion of each actuator arm;

a plurality of conductor strips supported in respective slots in the E-block, each conductor strip having an insulator ribbon containing a plurality of electrical conductors, an insulator termination portion rigidly mounted to a respective load beam and to the ribbon, the termination portion containing a plurality of electrical conductors connected between the transducer and respective conductors of the ribbon, a fin coupled to the ribbon, and a plurality of conductive tabs electrically connected to respective ones of the plurality of electrical conductors in the ribbon, the tabs extending from the fin; and a plurality of slots on the flex circuit and a plurality of conductive pads on the flex circuit adjacent each slot on the flex circuit, the conductive tabs being electrically connected and rigidly mounted to the pads on the flex circuit so that the conductor strips are in tension and the fins and ribbons on the conductor strips engage respective slots on the E-block and are restrained from disengaging from the slots on the E-block by the rigid connection of tabs to the pads the tension in the electrical conductors.

16. The actuator assembly of claim 15, furter including a stiffener plate fastening the flex circuit to the E-block.

17. The conductor assembly of claim 15, wherein the ribbon is retained in the slot by the tension in the electrical conductors.

* * * * *